(12) United States Patent
Bockes et al.

(10) Patent No.: US 9,042,543 B2
(45) Date of Patent: May 26, 2015

(54) METHOD FOR ARBITRARY-PRECISION DIVISION OR MODULAR REDUCTION

(75) Inventors: Markus Bockes, Munich (DE); Jurgen Pulkus, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 44 days.

(21) Appl. No.: 13/885,878

(22) PCT Filed: Nov. 16, 2011

(86) PCT No.: PCT/EP2011/005774
§ 371 (c)(1),
(2), (4) Date: May 16, 2013

(87) PCT Pub. No.: WO2012/065730
PCT Pub. Date: May 24, 2012

(65) Prior Publication Data
US 2013/0236006 A1    Sep. 12, 2013

(30) Foreign Application Priority Data
Nov. 18, 2010   (DE) .......................... 10 2010 051 853

(51) Int. Cl.
*H04L 9/00* (2006.01)
*H04L 9/32* (2006.01)
(Continued)

(52) U.S. Cl.
CPC ... *H04L 9/28* (2013.01); *G09C 1/00* (2013.01)

(58) Field of Classification Search
CPC ......... G06F 7/722; G06F 7/723; G06F 7/727; G06F 7/728; G06F 21/72; H04L 9/06; H04L 9/28; G09C 1/00

USPC ...................... 380/28–30; 713/174, 189, 192; 708/490, 503–504; 712/220–221
See application file for complete search history.

(56) References Cited

U.S. PATENT DOCUMENTS 5,499,299 A    3/1996   Takenaka et al.
7,412,474 B2 *  8/2008   Son ............................... 708/492
(Continued)

FOREIGN PATENT DOCUMENTS

EP    0 601 907 B1    2/2001
EP    2 003 547 A1   12/2008

OTHER PUBLICATIONS

P. Montgomery; "Modular Multiplication Without Trial Division", Mathematics of Computation, vol. 44, No. 170, pp. 519-521, Apr. 1985.
(Continued)

*Primary Examiner* — Hosuk Song
(74) *Attorney, Agent, or Firm* — Workman Nydegger

(57) ABSTRACT

A method in a portable data carrier for executing a cryptographic operation on security-relevant data comprises a step of determining a remainder (r) of a dividend (a) modulo a divisor (b). In so doing, the remainder (r) is determined iteratively by means of a division device of the data carrier. In each iteration there is carried out a Montgomery multiplication with the divisor (b) as the modulus and an additive linkage of an output value of the Montgomery multiplication with a coefficient ($a_i$) derived from the dividend (a) and associated with the respective iteration. The Montgomery multiplication is carried out here by means of a multiplication device of the data carrier, preferably a corresponding coprocessor. The Montgomery multiplication of a subsequent iteration receives a result of a preceding iteration as an input value.

19 Claims, 2 Drawing Sheets

(51) Int. Cl.
*H04L 9/28* (2006.01)
*G09C 1/00* (2006.01)

(56) References Cited

U.S. PATENT DOCUMENTS

| 8,433,736 | B2* | 4/2013 | Huang et al. | 708/233 |
| 8,583,902 | B2* | 11/2013 | Olson et al. | 712/221 |
| 8,781,112 | B2* | 7/2014 | Lambert | 380/28 |
| 2009/0089350 | A1 | 4/2009 | Sauzet et al. | |

OTHER PUBLICATIONS

International Search Report for PCT/EP2011/005774, Mar. 19, 2012.

* cited by examiner

METHOD FOR ARBITRARY-PRECISION DIVISION OR MODULAR REDUCTION

BACKGROUND OF THE INVENTION

A. Field of the Invention

The present invention relates to a method for executing a cryptographic operation on security-relevant data in a portable data carrier, and to an accordingly configured data carrier.

Within the framework of a cryptographic operation, e.g. an encryption or decryption of data, the generating of a digital signature or a verifying of the same, there are repeatedly employed basic operations. These are in particular an arbitrary-precision multiplication, arbitrary-precision division or modular reduction, for example within the framework of the computations of an RSA method or of a DSA or ECDSA signature algorithm.

The resource consumption for repeatedly carrying out a modular multiplication, as is necessary for example when computing a value of the form $x^d \mod n$, has been decisively reduced by using so-called Montgomery multiplication and thereby being able to omit an arbitrary-precision division as was necessary according to the hitherto known method. Montgomery multiplication is described in a clear way in the article "Modular Multiplication Without Trial Division" by Peter L. Montgomery, Mathematics of Computation, vol. 44, no. 170, April 1985, pp. 519-521. To increase this effect further, numerous portable data carriers that are configured for executing cryptographic operations comprise corresponding coprocessors for carrying out such Montgomery multiplication.

SUMMARY OF THE INVENTION

The object of the present invention is to also reduce the resource consumption for carrying out a modular reduction on a portable data carrier. In particular, the present invention sets itself the object of efficiently determining the remainder $r=a \mod b$ of a division $a/b$, in particular for the cases of a relatively large divisor b and of a dividend a that is substantially larger again than the divisor b.

A basic idea of the invention consists in adapting a division method such that individual method steps can be carried out as Montgomery multiplication, and thus more efficiently, possibly additionally by means of specific hardware.

A method according to the invention in a portable data carrier for executing a cryptographic operation on security-relevant data comprises a step of determining the remainder of a dividend modulo a divisor. In so doing, the remainder is determined iteratively by means of a division device of the data carrier. In each iteration there is carried out a Montgomery multiplication with the divisor as the modulus, and an additive linkage of an output value of the Montgomery multiplication with a coefficient derived from the dividend and associated with the respective iteration. The Montgomery multiplication is carried out here by means of a multiplication device of the data carrier. The Montgomery multiplication of a subsequent iteration receives a result of a preceding iteration as an input value.

Accordingly, a portable data carrier according to the invention for executing a cryptographic operation on security-relevant data comprises a processor, a memory, a multiplication device for carrying out a Montgomery multiplication, and a division device. The latter is configured to determine a remainder of a dividend modulo a divisor within the framework of the cryptographic operation. The division device is configured in particular to determine the remainder iteratively. For determining the remainder, the division device is configured to carry out in each iteration a Montgomery multiplication with the divisor as the modulus by means of the multiplication device, and to carry out an additive linkage of an output value of the Montgomery multiplication with a coefficient derived from the dividend and associated with the respective iteration. The multiplication device is configured to receive a result of a preceding iteration as an input value, for carrying out a Montgomery multiplication of a subsequent iteration.

This makes it possible to also efficiently carry out a modular reduction while circumventing a runtime-intensive ordinary arbitrary-precision division. That is to say, advantages are already achieved independently of the employed hardware by the fact that the number of computation steps to be carried out can be reduced. This also holds in particular for arbitrarily large dividends. A suitable decomposition of the dividend—in accordance with the stated coefficients—as precisely described hereinafter, and the iterative procedure of the method according to the invention, thus allow in particular also the employment in the data carrier of a multiplication device that is limited with regard to the input and output values. Only the divisor is bound to such a limitation according to the present method. The method is thus advantageously applicable in particular when the divisor is already rather large but the dividend is considerably larger again.

Preferably, the multiplication device of the data carrier comprises a coprocessor which is configured to carry out a Montgomery multiplication. Thus, the method according to the invention can be additionally accelerated by the fact that the steps of the Montgomery multiplication can be carried out by means of hardware optimized therefor. The thereby attainable double effect of reducing arithmetic operations to be carried out combined with the especially efficient carrying out of a large part of these operations by means of hardware optimized therefor makes the present method especially advantageous.

As mentioned, in the method according to the invention only the divisor is limited in its size by specifications of the multiplication device. Such a limitation is for example, upon employment of a coprocessor for carrying out the Montgomery multiplication, a word length processable by the coprocessor. The dividend is not subject to these specifications, i.e. the method or data carrier can process arbitrarily large dividends. This makes the method according to the invention superior in particular to an ordinary Montgomery reduction, which can only process dividends and divisors that are both smaller than an upper limit specified by the maximum coprocessor length.

The multiplication device of the data carrier can be configured to carry out a Montgomery multiplication with different input and output values, that is to say in particular that the size of input and output values can be restricted for design reasons. Common input and output values lie in the range of $-M$ to $M-1$ or in the range of 0 to $2*M-1$ or in the range of 0 to $R-1$. M designates here the modulus with regard to which the Montgomery multiplication is carried out, and R the number coprime to the modulus M and associated with M with regard to the Montgomery multiplication. It always holds that M is smaller than R. Hereinafter it will always be assumed, to simplify the presentation, that the input and output values of a Montgomery multiplication are not negative and smaller than the modulus M or smaller than the number R coprime to M.

With respect to the method according to the invention, such variants of Montgomery multiplication that differ with regard to the input and output values are to be distinguished, but they do not alter the method according to the invention in a fundamental way, but rather just in its details. Corresponding different embodiments of the method according to the invention will hereinafter be represented in detail.

The number of iterations that the method according to the invention requires for determining the remainder is limited by the ratio of the size of the dividend to the size of the divisor, i.e. substantially by a quotient that results from the logarithm of the dividend for a given base divided by the logarithm of the divisor for the base. For reducing a dividend in the form of a 1024-bit number modulo a dividend in the form of a 512-bit number, there are thus required only two or three iterations of the method, i.e. substantially only two or three Montgomery multiplications with 512-bit numbers.

The different embodiments of the method according to the invention normally have the following steps in common: In a first step the dividend is suitably decomposed. That is to say, the dividend is represented in the form of a sum. The number of summands of the sum corresponds here to the number of iterations required for determining the remainder. Each summand of the sum is composed of a product comprising the coefficient associated with the respective iteration, and a power of two associated with the iteration. If the dividend is designated for example as a, the decomposition has the following form:
$a = \Sigma_{i=0,\ldots,n} a_i * (2^N)^i$.

Subsequently the remainder to be computed, which is to be designated for example as r, is initialized. Depending on the embodiment, e.g. r:=0 or r:=$a_n$ is set.

In each iteration the following substeps are then carried out, with the remainder being respectively updated in each of the substeps: In a first substep there is carried out a Montgomery multiplication with the divisor as the modulus. The Montgomery multiplication receives here as input values the remainder as well as a compensation factor, and outputs an updated remainder. When a Montgomery multiplication of two values x and y with regard to a modulus M is designated as MMult(x, y, M), the described substep can be stated for short as follows: r:=MMult(r, m, b), where m designates the compensation factor and b the divisor assuming the role of the modulus. The compensation factor m here can assume for example the form m:=$2^N$*R mod b. R designates here the R value associated with the Montgomery multiplication. It holds by definition that MMult(x, y, M):=x*y*$R^{-1}$ mod M. M here is always odd, smaller than R and relatively prime to R, i.e. R and M have the value 1 as the greatest common divisor. The value $R^{-1}$—and the value M'—are defined at given M and R because of the divisibility condition via the equation R*$R^{-1}$−M*M'=1.

In a second substep the remainder is linked additively with the coefficient associated with the iteration. The result therefrom is finally reduced modulo the divisor so as to determine an updated remainder again. In the i-th iteration this step can be represented for example as follows: r:=r+$a_i$ mod b.

The order of the two substeps is variable, i.e. there are embodiments of the method in which the second substep is carried out before the first substep in each iteration.

Normally the updated remainder r delivers the sought value "a mod b" at the end of the last iteration. In some application contexts, however, it is desired to output the value "a*R mod b" instead of the value "a mod b". This can be obtained with an embodiment indicated hereinabove, which executes the second substep before the first, after suitable initialization of the remainder r, for example with r:=0.

A final Montgomery multiplication, after completion of the last iteration, can be employed to obtain an output value "a mod b" from the output value "a*R mod b". This Montgomery multiplication with the divisor as the modulus receives as an input the current remainder as well as the value "1", i.e. r:=MMult(r, 1, b).

As mentioned, in the sum representation of the dividend, each summand of the sum is composed of a product comprising the coefficient associated with the respective iteration, and a power of two associated with the iteration. This power of two respectively associated with the iteration consists of an iteration-independent basic power of two, which is for its part raised to a higher power again in dependence on the associated iteration. A basic power of two ($2^N$) is for example respectively raised in an iteration i to the i-th power, $(2^N)^i$, as already indicated hereinabove.

The size of the basic power of two is limited in dependence on the respective embodiment, for example by the size of the divisor or by the size of the R value associated with the modulus with regard to the Montgomery multiplication. That is to say, it holds for example that $(2^N)$<b or $(2^N)$≤R, in particular also $(2^N)$=R, because R is normally a power of two itself.

The size of the coefficients of the dividend is also limited according to the method, normally by the size of the modulus or by the size of the R value associated with the modulus with regard to the Montgomery multiplication. It usually holds here that the value limiting the size of the basic power of two also limits the size of the coefficients, i.e. with $(2^N)$<b it also holds that $a_i$<b, and with $(2^N)$≤R it holds that $a_i$<R.

Portable data carriers according to the invention may be in particular chip cards, secure memory cards and the like.

BRIEF DESCRIPTION OF THE DRAWINGS

The present invention will hereinafter be described by way of example with reference to the attached drawings. Therein are shown.

DETAILED DESCRIPTION OF PREFERRED EMBODIMENTS

Figure 1:
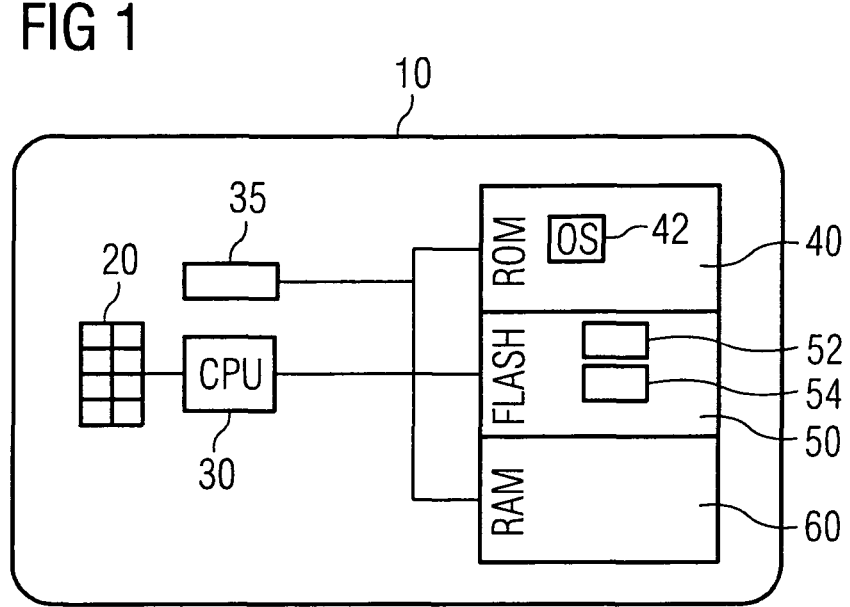
FIG. 1 a preferred embodiment of a data carrier according to the invention.

With reference to FIG. 1, a data carrier 10, which is represented here as a chip card, comprises a data communication interface 20, a processor 30, a coprocessor 35 as well as different memories 40, 50 and 60. The data carrier 10 can also be present in another design.

As a data communication interface 20, the data carrier 10 comprises a contact pad 20 for contact-type data communication. Alternatively or additionally, an antenna coil (not shown) can be provided for contactless data communication.

The non-volatile, non-rewritable ROM memory 40 comprises an operating system (OS) 42 of the data carrier 10, which controls the data carrier 10. At least parts of the operating system 42 can also be stored in the non-volatile, rewritable memory 50. The latter can be present for example as a flash memory.

The memory 50 comprises a cryptography device 52 by means of which cryptographic operations, for example an RSA method, can be computed. Further, the memory 50 comprises a division device 54. The latter is configured to determine the remainder of a dividend modulo a divisor within the framework of an operation computed by the cryptography device 54. The division device 54 can also be part of the cryptography device 52. The manner of functioning of the division device 54 will be described more precisely with reference to FIG. 2. The memory 50 can contain further applications and data, for example secret keys or portions thereof.

The coprocessor 35 performs the role of a multiplication device 35. It is configured to carry out a Montgomery multiplication. The multiplication device 35 will substantially be used by the cryptography device 52 and the division device 54 for carrying out the Montgomery multiplication within the framework of a computation of a cryptographic operation. Alternatively, a corresponding multiplication device 35 can also be made available as a software device in one of the memories 40, 50.

The volatile, rewritable RAM memory 60 serves the data carrier 10 as a working memory.

Before the manner of functioning of the division device 54 is described more precisely, some facts describing the overall context will be presented.

Hereinafter a dividend will always be designated as a, an odd divisor as b, the remainder of the dividend a modulo the divisor b as r, i.e. r=a mod b, and the quotient of a and b as q, i.e. q=a div b. Altogether the equation holds that a=q*b+r, where 0≤r<b is always satisfied. It will be appreciated that all values a, b, r, q as well as all values occurring hereinafter are integers.

A Montgomery multiplication with input values x and y with regard to a modulus M will be designated as MMult(x, y, M) and is computed as follows: MMult(x, y, M):=x*y*$R^{-1}$ mod M.

M is always odd here, smaller than R and relatively prime to R, i.e. R and M have the value 1 as the greatest common divisor. The value $R^{-1}$—and the hereinafter stated value M'—are defined at given M and R because of the divisibility condition via the equation R*$R^{-1}$−M*M'=1.

Normally it is to be assumed that the input values x and y are smaller than the modulus M. However, the Montgomery multiplication can in principle also be modified such that the input values are larger than the modulus M but still smaller than the value R. Then there is obtained as the output of the Montgomery multiplication, however, only a value C:=MMult(x, y, M)<R, for which it holds that C≡x*y*$R^{-1}$ mod M.

The classical Montgomery multiplication is computed as follows, as described in Montgomery's above-mentioned article: Inputting the values x and y which are both smaller than M, there is formed in a first step an intermediate value K by virtue of the rule K:=x*y*M' mod R (M':=−$M^{-1}$ mod R). Normally R is given as a power of two, R=$2^\delta$, so that a computation modulo R inside the data carrier corresponds only to a shift operation and is simple to execute. In a second step there is formed a value W, which is computed from the rule W:=(x*y+K*M)/R. The division by R is also simple to carry out when R is a power of two. It can be easily shown that this division is always possible without a remainder. When C:=W is now set, and if C≥M holds, C:=C−M is also formed, it can be shown that the value C corresponds to the output value of the Montgomery multiplication.

In the modified Montgomery method there are likewise formed for x and y, which are smaller than R, the values K:=x*y*M' mod R and W:=(x*y+K*M)/R. When C:=W is now set, and if C≥R holds, C:=C−M is also formed, it can be shown that C is smaller than R and C≡x*y*$R^{-1}$ mod M. In the special case y=1 it even follows that C≤M.

The fact that the modulus must always be odd does not constitute any substantial restriction, however. Should the divisor b serve as the modulus, it should be heeded that for b=$2^t$*$b_1$, a=$2^t$*$a_1$+$a_0$ with 0≤a<$2^t$ it holds that:

a mod b=$2^t$*($a_1$ mod $b_1$)+$a_0$ and a div b=$a_1$ div $b_1$. That is to say, it can always be assumed for simplicity's sake that b is odd.

Concrete implementations of Montgomery multiplication employ input and output values partly deviating from what is stated above. For example, input and output values can also lie in the range of −M to M−1, or the output can lie in the range of 0 to 2*M−1. In both cases there can be created with a conditional addition or subtraction of the modulus a situation corresponding to that described hereinabove.

In the present invention it is assumed that the multiplication device 35 configured to carry out the Montgomery multiplication is available, for example as a software module or as a coprocessor. In the case of the coprocessor, the latter possesses a coprocessor length β, i.e. it can accept values of the size <$2^\beta$. In many cases there is employed for the Montgomery multiplication the R value R=$2^\delta$ with δ=β. In other cases it holds that δ>β.

In the hereinafter described methods for determining the remainder a mod b, a suitable compensation factor $m_1$ is occasionally required as an input value of a Montgomery multiplication. This factor can have for example the form $m_1$=$R^2$ mod b. Such a value can be determined in different ways briefly sketched hereinafter.

If a fast arbitrary-precision multiplication is available in the data carrier 10, the value $R^2$ div b, and therefrom $m_1$, can be computed with the help of a discrete Newton iteration. The value $R^2$ div b serves as an input value for example in a method according to Barrett reduction by means of which a modular remainder is likewise computable.

Alternatively, a value 2*R mod b or $2^t$*R mod b can first be computed (for a small, suitable t) and, on this basis, the value $m_1$=$2^\delta$*R mod b by means of some Montgomery multiplications and an exponentiation method. For computing the value $2^t$*R mod b the following method can be used: As an input value there is used the bit length L of the divisor b, i.e. it holds that $2^{L-1}$<b<$2^L$<$2^\delta$=R. It is set that c:=$2^L$−b and for each i=1, . . . , t+δ−L the loop c:=c+c mod b is carried out. This method is expedient when the value t+δ−L is small. If no modular addition is available in the data carrier 10, the operation c:=c+c mod b is to be replaced by the sequence of rules: c:=c+c; if c≥b, set c:=c−b.

If b is a secret number, for example a portion of the security-relevant data on which the cryptographic operation is carried out, the implementation of the request "c≥b" must be protected from side channel attacks. This also holds for other operations executed by the processor or, if present, the coprocessor on any portions of the security-relevant data or values derived therefrom or intermediate results, without this always being stated again hereinafter.

Figure 2:
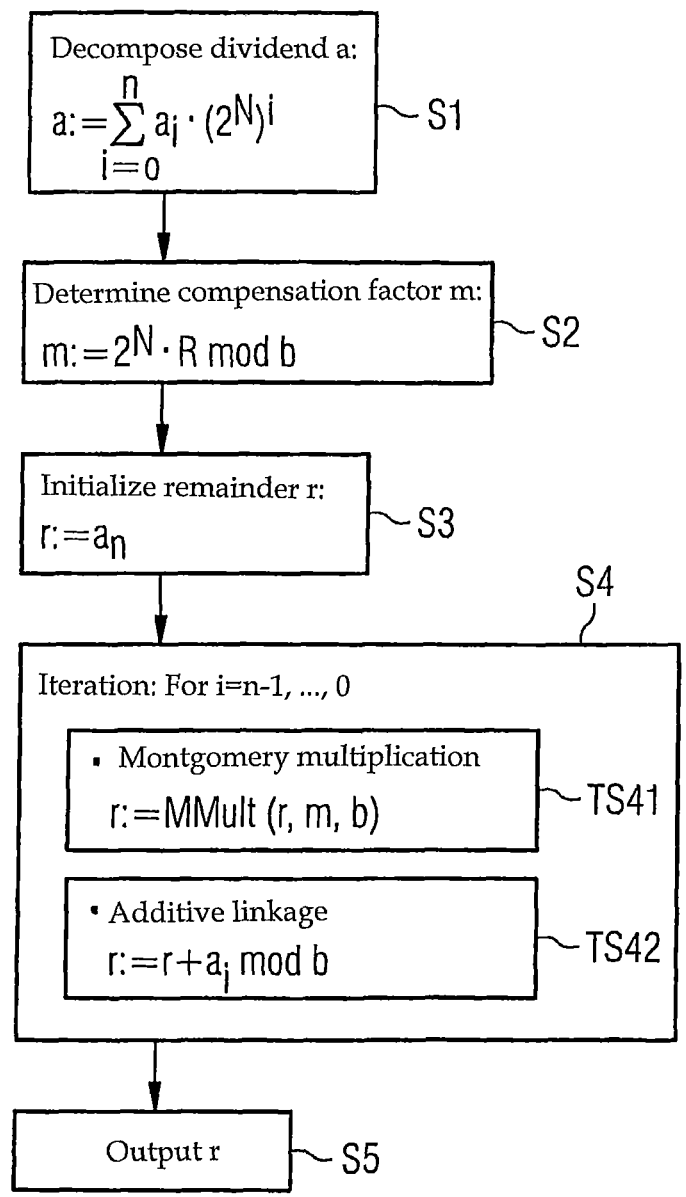
FIG. 2 steps of a preferred embodiment of a method according to the invention.

With reference to FIG. 2 there will hereinafter be presented different embodiments of a method for determining a remainder r of a dividend a modulo a divisor b. The division device 54 is respectively configured here to execute one or several of these methods. The same holds for the auxiliary methods described and yet to follow, for example for efficiently determining suitable compensation factors m and the like. Preferably, the data carrier 10 has a device for carrying out a modular addition/subtraction.

In the first two embodiments there is employed a Montgomery multiplication whose input and output values are limited by the modulus M. The third embodiment uses a Montgomery multiplication whose input and output values can be larger and are limited only by the value R.

The method according to the first embodiment receives as an input an odd divisor b. The latter can be accepted by the coprocessor 35, i.e. it holds that $b<2^\beta \leq 2^\delta = R$ with $2^N < b$. N is a suitably chosen integer here, for example the greatest possible multiple of 8, 16 or 32 that satisfies $2^N < b$.

As a further input there is used the dividend a. The latter is decomposed in a first step S1 in the following form: $a = \Sigma_{i=0,\ldots,n} a_i * (2^N)^i$, $0 \leq a_i < 2^N$.

The decomposition of the dividend a into a sum is preferably effected in such a way that the number of summands of the sum corresponds to the number of iterations required for determining the remainder, which will be described hereinafter in detail. Each summand of the sum is normally composed of a product. This product comprises the coefficient $a_i$ of a associated with the iteration, and a power of two associated with the iteration, here $(2^N)^i$. This power of two results from an iteration-independent basic power of two, here $2^N$, which is raised to a higher power again in an iteration-dependent manner, here to the power of i.

Finally, the method also receives the compensation factor $m_1 = R^2$ mod b as an input value. As an output value the method outputs the remainder r=a mod b.

In a second step S2 an adapted compensation factor m is determined from the compensation factor $m := \text{MMult}(m_1, 2^N, b) = 2^N * R$ mod b. Alternatively, m can also be employed directly as an input value instead of so that this step is omitted within the method.

The remainder r is now determined iteratively. In each iteration there is carried out a Montgomery multiplication with the divisor b as the modulus, and an additive linkage of an output value of the Montgomery multiplication with a coefficient $a_i$ derived from the dividend a and associated with the respective iteration. The Montgomery multiplication of a subsequent iteration receives a result of a preceding iteration as an input value. Each of the Montgomery multiplications is carried out by means of the multiplication device 35, preferably by means of a corresponding coprocessor 35.

Specifically, these steps according to the first embodiment of the method are executed as follows:

The remainder is initialized in step S3, according to the first embodiment by virtue of the rule $r := a_n$.

In step S4 the actual iterative computation of r is finally effected. Each iteration comprises two substeps TS41, TS42: Firstly, in substep TS41, a Montgomery multiplication with the divisor b as the modulus, the Montgomery multiplication receiving as input values the current remainder r and the compensation factor m, and outputting as an output value the updated remainder r:$r := \text{MMult}(r, m, b)$. Secondly, in substep TS42, an additive linkage of the remainder r with the coefficient $a_i$ associated with the iteration, and a modular reducing of the corresponding result modulo the divisor b, to obtain an updated remainder: $r := r + a_i$ mod b.

At the end of the last iteration the remainder r=a mod b is output as the result in step S5.

The method will be briefly described here once again (algorithm 3).

Input odd divisor $b < 2^\beta \leq R$ with $2^N < b$,
   Montgomery factor $m_1 = R^2$ mod b,
   arbitrarily large dividend a
Output r=a mod b
Method
S1 Decompose $a = \Sigma_{i=0,\ldots,n} a_i * (2^N)^i$ with $0 \leq a_i < 2^N$
S2 Compute $m := \text{MMult}(m_1, 2^N, b) = 2^N * R$ mod b
S3 Set $r := a_n$
S4 For i=n-1, . . . , 0:
TS41 $r := \text{MMult}(r, m, b)$
TS42 $r := r + a_i$ mod b
S5 Output r The correctness of the method is readily apparent. If no modular addition is available in the data carrier 10, the substep TS42 must be replaced by the following steps:
$r := r + a_i$, if $(r \geq b)$, $r := r - b$.

It is striking—and this also holds for the hereinafter described further embodiments—that only the size of the divisor b, but not the size of the dividend a, is limited by specifications of the multiplication device 35, here the coprocessor length β. The dividend a can be arbitrarily large and becomes processable by means of the method by the coefficient $a_i$ derived from the dividend a being chosen such that the results derived from these coefficients, for example from substep TS42, are in turn processable by the multiplication device 35, in substep TS41. According to the shown first embodiment, the coefficients $a_i$ are limited at least by the size of the modulus b.

If in a concrete application context of the cryptographic operation to be carried out—for example within the framework of an RSA-CTR computation—there is required not the value r, but the value derived therefrom $c := a * R$ mod b, this can be easily obtained by adding to the hereinabove described method according to the first embodiment a further step according to the rule: $c := \text{MMult}(r, m, b)$. The value c—if a represents the base of the RSA-CRT computation and b one of the two prime factors—then goes as an input value into one of the two partial exponentiations of the RSA-CRT computation, which are for their part built on Montgomery multiplications.

Hereinafter it will be explained how an RSA-CRT computation can be accelerated with the above method. In RSA-CRT two partial exponentiations $x^{dp}$ mod p and $x^{dq}$ mod q are carried out, where x designates the input message, p and q the two prime factors of the modulus, and dp=d mod p-1 and dq=d mod q-1 numbers derived from the secret exponent d. For example, the bit length of x is equal to 2048 bits and that of p, q, dp and dq equal to 1024 bits. To be able to carry out a partial exponentiation $x^{dp}$ mod p, however, x mod p must first be computed. This value then goes as an initial value into the exponentiation algorithm. The exponentiation algorithm itself consists of a sequence of modular multiplications which are preferably realized as Montgomery multiplications, in particular when a hardware accelerator supports the Montgomery multiplication. In this case the value x mod p must also be transformed to $x * R$ mod $p = \text{MMult}(x, R^2 \text{ mod } p, p)$. Thus, to supply the initial values for a partial exponentiation, a modular reduction x mod p is usually first carried out, and subsequently a Montgomery multiplication $x*R$ mod $p = \text{MMult}(x, R^2 \text{ mod } p, p)$. However, the modular reduction is expensive, e.g. when a 2048-bit number must be divided by a 1024-bit number with the CPU. In the new method, in contrast, the expensive arbitrary-precision division and subsequent Montgomery multiplication are replaced by just a few Montgomery multiplications.

The hereinafter presented method according to a second embodiment is slightly modified over the first embodiment. It outputs not the remainder r itself, but the just mentioned value $c := a * R$ mod b. If only the value c is to be determined, this method is slightly superior to the first embodiment, whereas the latter is generally to be preferred when computing r. However, from the value c the value r can in turn be obtained in one step by virtue of the rule $r := \text{MMult}(c, 1, b)$. It is to be noted that the following method provides advantages only when $\log_2(a) - \log_2(b)$ is considerably larger than $\log_2(R) - \log_2(b)$, i.e. when a is considerably larger than R.

The inputs to the method according to the second embodiment correspond substantially to those of the first embodiment: an odd divisor b with $b < 2^\beta \leq 2^\delta = R$, and a dividend a of the form $a=\Sigma_{i=0,\ldots,n} a_i*(R)^i$, $0 \le a_i < R$, as well as a compensation factor $m_1 \equiv R^2$ mod b. In contrast to the first embodiment, the basic power of two is now specified directly by the value R, which also limits the size of the coefficients $a_i$ of the dividend a.

The method outputs at the end, as mentioned, not r=a mod b, but c=a*R mod b.

The initialization of the value c is effected by the step c:=0.

Upon the iterative determination of the value c, the substeps TS41 and TS42 are interchanged in comparison to the first embodiment. In each iteration an updated value c is determined in a first substep. This is effected by means of the function $T(c+a_i)=c+a_i$ mod b. Thus, there is carried out in this substep as well—analogously to the method of the first embodiment—an additive linking of a value c corresponding to the remainder with the coefficient $a_i$ belonging to the iteration, as well as a reducing modulo the divisor b. It is to be noted that the function T accepts values in the range of 0 to R+b-1 as input, and outputs values smaller than b. When R is not substantially larger than b, the computation of the function T can be effected for example by repeated subtracting of b.

In a second substep of the iteration there is then effected a Montgomery multiplication: c:=MMult(c, $m_1$, b). At the end of the last iteration the value c is output. The correctness of this method is also readily apparent.

The method will be briefly described here once again (algorithm 4).

Input odd divisor $b < 2^\beta \le R$,
  Montgomery factor $m_1 \equiv R^2$ mod b,
  arbitrarily large dividend a
Output c≡a*R mod b
Method
(1) Decompose $a=\Sigma_{i=0,\ldots,n} a_i*(R)^i$ with $0 \le a_i < R$
(2) Set c:=0
(3) For i=n, ..., 0:
(3.1) $c:=T(c+a_i)=c+a_i$ mod b
(3.2) c:=MMult(c, $m_1$, b)
(4) Output c The hereinafter described third embodiment is suited for computing the remainder r=a mod b when there is available a multiplication device 35 that can accept as input and output values those values that are limited only by the value R.

Here, too, there is employed as an input value a compensation factor m which satisfies at least the following conditions: $0 < m_1 < R$ and $m_1 \equiv R^2$ mod b. This value can be determined as described hereinabove. A value that is congruent to 2*R mod b can be determined especially efficiently as follows:

The bit length L of b is specified, i.e. it holds that $2^{L-1} < b < 2^L \le R$. On this basis a value $e:=(2^L-b)*2^{\beta-L+1}$ is computed. It can be easily understood that $e \equiv 2*R$ mod b. The computation of $m_1$ from e is then subject to the same considerations as already stated above.

The now presented third embodiment corresponds substantially to the hereinabove described second embodiment:

As an input the method receives an odd divisor b with b<R, $2^{L-1} < b < 2^L$, a dividend a of the form $a=\Sigma_{i=0,\ldots,n} a_i*(R)^i$, $0 \le a_i < R$, as well as a compensation factor $m_1 \equiv R^2$ mod b. The output is a value r=a mod b and a value c, where it holds that $0 \le c < R$ and $c \equiv a*R$ mod b.

A value c, corresponding to the value c in the second method, is initialized by c:=0.

For all i=n, ..., 0 there is carried out an iteration comprising the two described substeps: additive linkage followed by modular reduction as well as Montgomery multiplication. The first substep here has the form:
$c:=c+a_i$; As long as $(c \ge R): c:=c-(2^{\beta-L}*b)$.

This substep finally delivers a value that is congruent to $c+a_i$ mod b and smaller than R. The reduction of c by $(2^{\beta-L}*b)$ must be executed at most twice, because according to the precondition it holds that $a_i < R < 2*(2^{\beta-L}*b)$.

The second substep is effected analogously to the second embodiment according to c:=MMult(c, m, b).

If at the end r=a mod b is to be output instead of c=a*R mod b, the step r:=MMult(c, 1, b) is added again, as mentioned. If it results that r=b, r:=0 is set.

The method will be briefly described here once again (algorithm 11).

Input odd divisor b<R with $2^{L-1} < b < 2^L$
  Montgomery factor $m_1 < R$ with $m_1 \equiv R^2$ mod b
  arbitrarily large dividend a
Output r=a mod b and number $0 \le c < R$ with $c \equiv a*R$ mod b
Method
(1) Decompose $a=\Sigma_{i=0,\ldots,n} a_i*(R)^i$ with $0 \le a_i < R$
(2) Set c:=0
(3) For i=n, ..., 0:
(3.1) $c:=c+a_i$
(3.2) As long as $(c \ge R): c:=c-(2^{\beta-L}*b)$
(3.3) c:=MMult(c, $m_1$, b)
(4) Compute r:=MMult(c, 1, b)
(5) If (r=b):r:=0
(6) Output r and c The correctness is easy to see here, too. In particular, it results from the introductory discussion of Montgomery multiplication that the value r is smaller than or equal to b at the end after a Montgomery multiplication with 1.

The invention claimed is:

1. A method in a portable data carrier for executing a cryptographic operation on security-relevant data, comprising a step of determining a remainder (r) of a dividend modulo a divisor (b),
  wherein the remainder (r) is determined iteratively by means of a division device of the data carrier, by carrying out in each iteration a Montgomery multiplication (TS41) with the divisor (b) as the modulus, and an additive linkage (TS41) of an output value of the Montgomery multiplication with a coefficient ($a_i$) derived from the dividend (a) and associated with the respective iteration, the Montgomery multiplication being carried out by means of a multiplication device of the data carrier, and the Montgomery multiplication of a subsequent iteration receiving a result of a preceding iteration as an input value.

2. The method according to claim 1, wherein the multiplication device comprises a coprocessor which carries out the Montgomery multiplication.

3. The method according to claim 1, wherein only the size of the divisor (b) is limited by specifications of the multiplication device, and the size of the dividend (a) is not limited by specifications of the multiplication device.

4. The method according to claim 1, wherein the number of iterations for determining the remainder (r) is limited by a quotient which results from the logarithm of the dividend (a) for a given base divided by the logarithm of the divisor (b) for said base.

5. The method according to claim 1, further comprising the following steps:
  decomposing (S1) the dividend (a) in the form of a sum, the number of summands of the sum corresponding to the number of iterations required for determining the remainder (r), and each summand of the sum being composed of a product comprising the coefficient ($a_i$)

associated with the respective iteration and a power of two ($2^{N*i}$; $R^i$) associated with the iteration;

initializing (S3) the remainder (r);

carrying out (S4) the following substeps in each iteration, with the remainder (r) being respectively updated in each of the substeps:

carrying out a Montgomery multiplication (TS41) with the divisor (b) as the modulus, the Montgomery multiplication receiving as input values the remainder (r) as well as a compensation factor (m) and outputting an updated remainder (r);

additively linking (TS42) the remainder (r) with the coefficient ($a_i$) associated with the iteration and modularly reducing the result modulo the divisor (b) to determine an updated remainder (r).

6. The method according to claim 5, wherein, if the substep (TS42) of additive linking is carried out before the substep (TS41) of carrying out the Montgomery multiplication within the iteration, there is finally carried out a further Montgomery multiplication with the divisor (b) as the modulus, which receives as input values the remainder (r) and the value one and outputs an updated remainder (r).

7. The method according to claim 5, wherein the power of two ($2^{*i}$; $R^i$) respectively associated with an iteration consists of a basic power of two ($2^N$; R) which is for its part raised to a higher power again in dependence on the associated iteration.

8. The method according to claim 7, wherein the size of the basic power of two ($2^N$; R) is limited by the size of the divisor (b) or by the size of the R value associated with the modulus with regard to the Montgomery multiplication.

9. The method according to claim 1, wherein the size of the output value of the Montgomery multiplication is limited by the size of the modulus or by the size of the R value associated with the modulus with regard to the Montgomery multiplication.

10. The method according to claim 1, wherein the size of the coefficients ($a_i$) of the dividend (a) is limited by the size of the modulus or by the size of the R value associated with the modulus with regard to the Montgomery multiplication.

11. The method according to claim 1, further comprising decomposing (S1) the dividend (a) in the form of a sum, the number of summands of the sum corresponding to the number of iterations required for determining the remainder (r), and each summand of the sum being composed of a product comprising the coefficient ($a_i$) associated with the respective iteration and a power of two ($2^{N*i}$; $R^i$) associated with the iteration.

12. The method according to claim 1, further comprising initializing (S3) the remainder (r).

13. The method according to claim 1, further comprising carrying out (S4) the following substep in each iteration, with the remainder (r) being respectively updated in each of iteration:

carrying out a Montgomery multiplication (TS41) with the divisor (b) as the modulus, the Montgomery multiplication receiving as input values the remainder (r) as well as a compensation factor (m) and outputting an updated remainder (r).

14. The method according to claim 1, further comprising carrying out (S4) the following substep in each iteration, with the remainder (r) being respectively updated in each of iteration:

additively linking (TS42) the remainder (r) with the coefficient (at) associated with the iteration and modularly reducing the results modulo the divisor (b) to determine an updated remainder (r).

15. The method according to claim 1, further comprising wherein the Montgomery multiplication is carried out such that input and output values of the Montgomery multiplication lie in the range of −M to M−1 or in the range of 0 to 2*M−1 or in the range of 0 to R−1, where M designates the modulus with regard to which the Montgomery multiplication is carried out, and where R designates the number comprime to the modulus M and associated with M with regard to the Montgomery multiplication.

16. A portable data carrier for executing a cryptographic operation on security-relevant data, comprising a processor, a memory, a multiplication device for carrying out a Montgomery multiplication, and a division device which is configured to determine a remainder (r) of a dividend (a) modulo a divisor (b) within the framework of the cryptographic operation, wherein the division device is configured to determine the remainder (r) iteratively by there being carried out in each iteration a Montgomery multiplication with the divisor (b) as the modulus by means of the multiplication device and an additive linkage of an output value of the Montgomery multiplication with a coefficient ($a_i$), derived from the dividend (a) and associated with the respective iteration, by means of the division device, the multiplication device being configured to receive a result of a preceding iteration as an input value, for carrying out a Montgomery multiplication of a subsequent iteration.

17. The data carrier according to claim 16, wherein the multiplication device is configured as a coprocessor.

18. The data carrier according to claim 16, wherein the multiplication device is configured to carry out a Montgomery multiplication whose input and output values lie in the range of −M to M−1 or in the range of 0 to 2*M−1 or in the range of 0 to R−1, where M designates the modulus with regard to which the Montgomery multiplication is carried out, and where R designates the number coprime to the modulus M and associated with M with regard to the Montgomery multiplication.

19. The data carrier according to claim 16, wherein the division device is configured to carry out a method according to claim 1.

* * * * *